J. COLEMAN,

Assignor to C. H. BLODGETT.

Car Coupling.

No. 9,562. Reissued Feb. 15, 1881.

Witnesses.
A B Robertson.
Chas. A. Pettit

Inventor:
John Coleman
Per J. J. W. Robertson,
His attorney

N. PETERS, PHOTO-LITHOGRAPHER, WASHINGTON, D. C.

UNITED STATES PATENT OFFICE.

JOHN COLEMAN, OF LYNCHBURG, VIRGINIA, ASSIGNOR TO CALVIN H. BLODGETT, OF BURLINGTON, VERMONT.

CAR-COUPLING.

SPECIFICATION forming part of Reissued Letters Patent No. 9,562, dated February 15, 1881.

Original No. 102,500, dated May 3, 1870. Application for reissue filed June 19, 1879.

*To all whom it may concern:*

Be it known that I, JOHN COLEMAN, of Lynchburg, in the county of Campbell and State of Virginia, have invented certain new and useful Improvements in Car-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
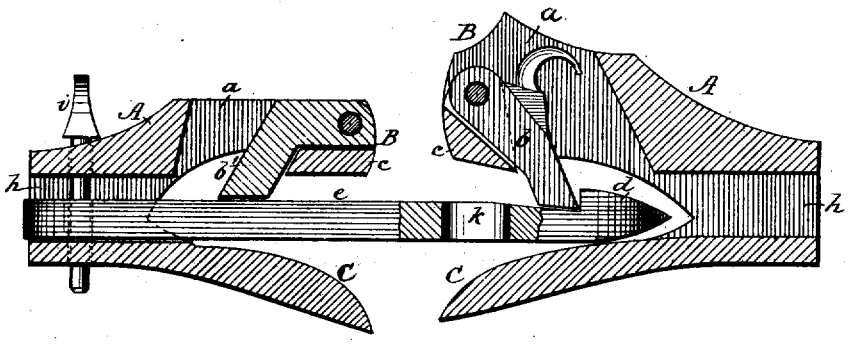
Figure 2:
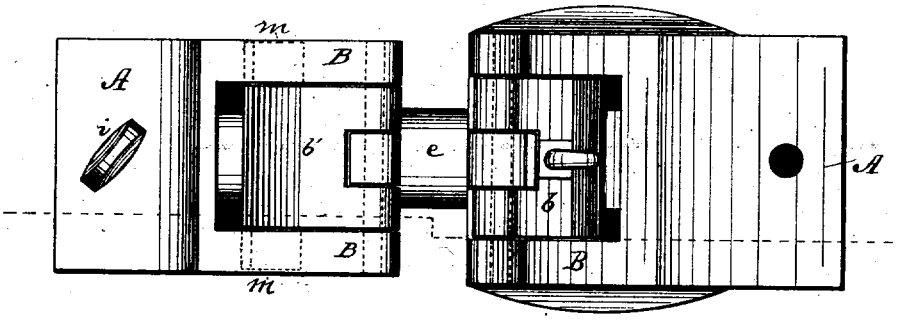

Figure 1 is a longitudinal vertical section through the line *x x* of Fig. 2, which represents a plan.

This invention relates to that class of car-couplings designed to uncouple when the cars run off the track; and it consists, mainly, in such a construction of the parts as will allow of such couplings being coupled automatically when the cars to which they are attached are run together without impairing their capability of automatically separating in case of accident.

Previous to this invention couplings had been made in which hooks ran into recesses closed at their sides and were there held by pivoted pieces of various form. Another coupling had been made with a link passing into a recess between two fixed arms, where it was held fast by a pivoted cam. Other couplings have been patented consisting of hooks pivoted to each other, or to the draw-head, and held together by springs, so as to hold between them a hook or headed pin; and still other couplings were used consisting of a single hook at one end of a car held by a spring in locked engagement with a similar hook on another car. Both of these last two classes are dependent upon springs for their proper operation, and are therefore insecure. The other couplings described are reliable; but there is no provision for their uncoupling should one of the cars pass off the track. It has been proposed to remedy this by holding a hook between the arms of a forked draw-head by a detached wheel, which requires to be placed in position by hand; but as this increased the difficulty of coupling it has never come into general use.

The coupling hereinafter described possesses all the advantages of these different classes of couplings without their disadvantages, as it is an automatic coupler, yet readily uncouples in case of accident, and does not depend on springs to keep the coupling together.

Cars sometimes get off the track by dropping downward, as from some break in the track—such as an open or broken bridge, &c.; but owing to the great care now taken such accidents seldom occur, and when cars do get off the track they generally pass off sidewise, and I therefore make my coupling so that it will separate sidewise if an accident occurs.

In the accompanying drawings, A A are the draw-heads, open at the sides, so as to form two branches, B B, C C, and having recesses *a a* cut through their upper branches, B B, in which recesses the swinging detents *b b* are hung by pivots passing through their upper ends. Each detent rests on an inclined shelf, *c*, extending across the recess in the front part of the draw-head, so that the detents incline backward, and hence present no obstacle but their weight to prevent the running in of the beveled head of the coupling-hook *d* between the straight detent *b* and the branch C, which branch C acts both as a guide and keeper, as it guides the hook under the detent and holds it there as long as the cars retain their normal position on the track.

The swinging detent is shown in two forms. The one on the right in the drawings has plain sides, but the left one, *b′*, is broadened out at each side, so as to form ears *m m*, which are shown in dotted lines. These ears have several objects, one of which is to prevent the detent having too much motion in the recess, another to broaden its bearing-surface, and a third that they may be used to move the swinging detent by hand, when the hook *d* is used under a detent, *b′*, instead of the detent *b*, as shown in the drawings.

To use this coupling the movable hook *d* is secured in one of the draw-heads by a pin, *i*, as shown, in a horizontal position, or nearly so, and is thus caused to enter between the branch C and swinging detent *b* on the opposite draw-head, which detent, as soon as the hook *d* has entered far enough, will swing to allow the hook to enter and then drop, thus holding the hook in position and securely coupling the cars as long as they remain on the track; but should one of the cars run off the hook *d* will readily move out from between the branch C and swinging detent *b*, and thus uncouple the displaced car from those still remaining on the track.

I do not wish to be understood as limiting myself to the exact construction herein shown, as other forms may be used without departing from the main feature of my invention, which consists, essentially, in the use, in a car-coupling, of a draw-head having two branches, one of which acts as a guide and keeper, and the other carries a swinging detent, the whole being so constructed as to securely hold a hook from another draw-head when the cars are on the track, and to allow the draw-heads to separate should one of the cars get off.

What I claim as new is—

1. A bifurcated draw-head having a swinging detent, in combination with a hook adapted for automatic coupling when the cars are run together, and for automatic uncoupling should a car get off the track, substantially as described.

2. The combination of a draw-head, A, having two fixed branches, one of said branches, B, carrying a swinging detent, *b*, the other branch, C, acting as a guide and guard, with a hook, *d*, from another draw-head, the whole being constructed to securely hold said hook while the cars are in their proper position, and yet allow the hook to slide out should a car get off the track, substantially as described.

3. The combination, with a bifurcated draw-head, of a swinging detent having ears *m m*, forming extensions of the holding end of the detent, whereby said ears serve as handles to move the detent, and also as extensions to increase the holding-surface of said detent, to prevent the uncoupling of the cars in turning curves, substantially as described.

In testimony that I claim the foregoing I have hereunto set my hand this 16th day of June, 1879.

JOHN COLEMAN.

Witnesses:
JOHN H. LEWIS,
W. W. H. HARRIS.